US012710442B2

(12) United States Patent
Johnson

(10) Patent No.: US 12,710,442 B2
(45) Date of Patent: Aug. 18, 2026

(54) SYSTEM AND METHOD FOR A HIGH SPEED HYBRID SONIC AND MECHANICAL TEMPERATURE AND WIND MEASUREMENT SENSOR

(71) Applicant: Michigan Aerospace Corporation, Ypsilanti, MI (US)

(72) Inventor: William Eric Johnson, Saline, MI (US)

(73) Assignee: MICHIGAN AEROSPACE CORPORATION, Dexter, MI (US)

( * ) Notice: Subject to any disclaimer, the term of this patent is extended or adjusted under 35 U.S.C. 154(b) by 357 days.

(21) Appl. No.: 18/270,169

(22) PCT Filed: Dec. 30, 2021

(86) PCT No.: PCT/US2021/065720

§ 371 (c)(1),
(2) Date: Jun. 28, 2023

(87) PCT Pub. No.: WO2022/147277

PCT Pub. Date: Jul. 7, 2022

(65) Prior Publication Data

US 2026/0118375 A1 Apr. 30, 2026

Related U.S. Application Data

(60) Provisional application No. 63/132,654, filed on Dec. 31, 2020.

(51) Int. Cl.

| | |
|---|---|
| ***G01P 5/24*** | (2006.01) |
| ***G01K 13/024*** | (2021.01) |
| ***G01P 13/02*** | (2006.01) |

(52) U.S. Cl.

CPC ............ *G01P 5/248* (2013.01); *G01K 13/024* (2021.01); *G01P 13/02* (2013.01)

(58) Field of Classification Search

CPC ........ G01P 5/248; G01P 13/02; G01K 13/024

(Continued)

(56) References Cited

U.S. PATENT DOCUMENTS 4,174,630 A * 11/1979 Nicoli ........................ G01P 5/18 73/170.13

2017/0003176 A1 1/2017 Le et al.

FOREIGN PATENT DOCUMENTS

CN 206193270 U 5/2017

CN 111366750 A * 7/2020 .............. G01P 5/245

(Continued)

OTHER PUBLICATIONS

Translation of KR-100941289-B1 (Year: 2010).*

(Continued)

*Primary Examiner* — Nathaniel T Woodward

(74) *Attorney, Agent, or Firm* — Juan Carlos A. Marquez; Marquez IP Law Office, PLLC

(57) ABSTRACT

The present invention is a one-dimensional sonic anemometer paired with a tail vane that continuously rotates the sonic anemometer to be coaligned with the prevailing wind. The one-dimensional sonic anemometer being coaligned with the wind vector can measure the total wind speed directly with the wind direction measured by detection of the relative orientation of the instrument with respect to North as the instrument is held into the wind. Rather than a conventional two-dimensional sonic anemometer, the invention is a hybrid one-dimensional sonic anemometer with a mechanical wind direction measurement.

11 Claims, 9 Drawing Sheets

(58) Field of Classification Search
USPC ........................................................ 73/170.11
See application file for complete search history.

(56) References Cited

FOREIGN PATENT DOCUMENTS

| | | | |
|---|---|---|---|
| KR | 100941289 B1 * | 2/2010 | ........... G01N 29/022 |
| KR | 20160032585 A | 3/2016 | |
| WO | 2020210355 | 10/2020 | |

OTHER PUBLICATIONS

Translation of CN-111366750-A (Year: 2020).*
PCT International Search Report mailed Mar. 22, 2022 in counterpart PCT application PCT/US2021/165720, 2 pages.
PCT Written Opinion mailed Mar. 22, 2022 in counterpart PCT application PCT/US2021/165720, 7 pages.

* cited by examiner

SYSTEM AND METHOD FOR A HIGH SPEED HYBRID SONIC AND MECHANICAL TEMPERATURE AND WIND MEASUREMENT SENSOR

This application claims priority to U.S. Provisional Application No. 63/132,654 filed on Dec. 31, 2020, the entire disclosure and contents of which are incorporated herein in their entireties by reference.

BACKGROUND OF THE INVENTION

Historically there are multiple sensors that can measure wind speed and direction including lidars, sodars, mechanical anemometers, and sonic anemometers. Sonic anemometers also have a distinct advantage over other measurement methods in that they can make measurements with high signal to noise ratios and short response times due to the fact that they do not suffer from the thermal mass limitations of thermistors or the shot noise limitations of active optical remote sensing methods. Mechanical anemometers are simple and low in cost but suffer from needing regular calibrations to maintain high accuracy. Sonic anemometers do not have mechanical parts that wear like mechanical anemometers and thus do not suffer from the same wear and tear that mechanical anemometers do.

However, sonic anemometers are generally expensive, and their cost increases with the number of wind components resolved. Some sonic anemeters reduce costs by assuming vertical winds are negligible and only measure two components of the wind velocity vector. A sonic anemometer that only measures one component of the wind velocity vector would be even lower in cost but on its own does not provide information generally considered useful to users who wish to know the total wind speed and direction.

There are examples of mechanical anemometers that continuously rotate the mechanical wind speed sensor into the wind with a tail vane. By recording the rotational orientation of the tail vane in combination with the wind speed sensor the two dimensional speed speed and direction can be known. A further improvement can be made by combining a tail vane with a one dimensional sonic aneometer sensor.

SUMMARY OF THE INVENTION

The present invention is a one-dimensional sonic anemometer paired with a tail vane that continuously rotates the sonic anemometer to be coaligned with the prevailing wind. The one-dimensional sonic anemometer being coaligned with the wind vector can measure the total wind speed directly with the wind direction measured by detection of the relative orientation of the instrument with respect to North as the instrument is held into the wind. Rather than a conventional two-dimensional sonic anemometer the invention is a hybrid one-dimensional sonic anemometer with a mechanical wind direction measurement.

In at least one embodiment, the present invention is directed to a hybrid stationary anemometer system for measuring a volume space of interest in an atmosphere, comprising: a mechanical wind vane to align at least one 1-dimensional anemometer in the wind direction and measures the wind direction; and an electronic circuitry that processes the data from the mechanical wind vane and the active anemometer. In a further embodiment, the 1-dimensional anemometer incorporates an output signal generator and the received signal detector are at least one piezo and/or electromagnetic emitter operatively connected to receive an output signal from the processing circuit and to emit the output signal through the volume space; and at least one piezo and/or electromagnetic receiver spatially separated and operatively mounted to receive the output signal emitted through the volume space from the at least one piezo emitter.

In operation, an anemometer system according to the present invention uses a wind vane that is mechanically and freely rotatable to align with the direction of the wind in the volume space, and align with one or more active 1-dimensional sonic anemometer. The anemometer system is integrated with electronics to provide a high degree of accuracy and a high update rate for measuring wind speed and direction.

BRIEF DESCRIPTION OF THE DRAWINGS

The present invention is illustrated in the accompanying drawings, wherein.

DETAILED DESCRIPTION OF THE INVENTION

Figure 1:
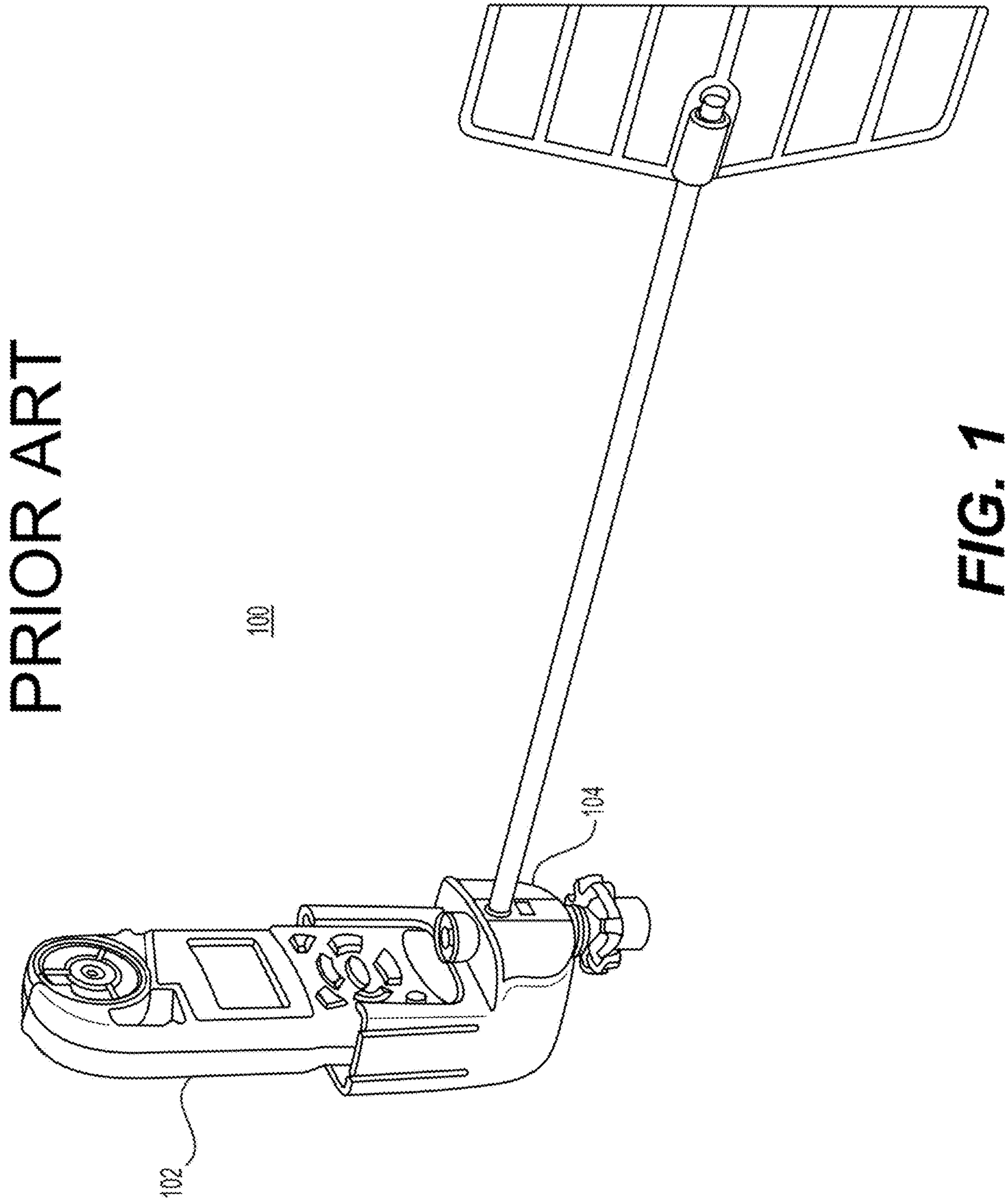
FIG. 1 shows first embodiment of a combination of mechanical wind speed sensor and rotating mount driven by the tail vane in ambient winds as known in the prior art.

As an example of a combination tail-vane and mechanical anemometer known in the prior art, FIG. 1 shows an example of a prior art device 100 composed of a commercial wind speed sensor 102 mounted onto a rotating tail vane 104.

Figure 2A:
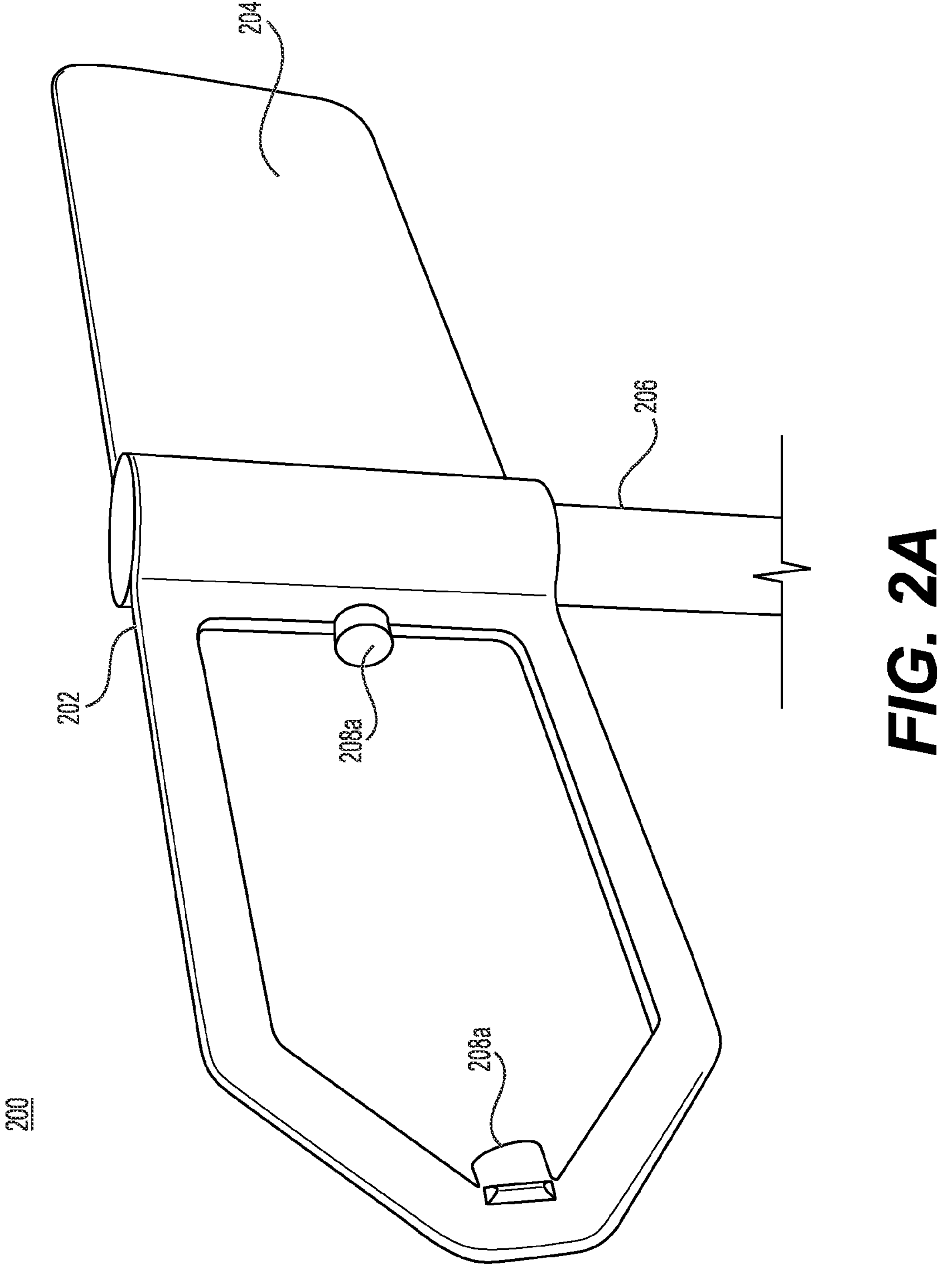
FIGS. 2A and 2B show a design for a hybrid sonic anemometer according to the present invention where the speed of sound is measured with an internal thermometer, the wind speed is measured with acoustic time of flight, and wind direction is determined by measuring the angle of rotation of the housing as it spins freely on its post to be oriented colinear with the prevailing wind.
Figure 2B:
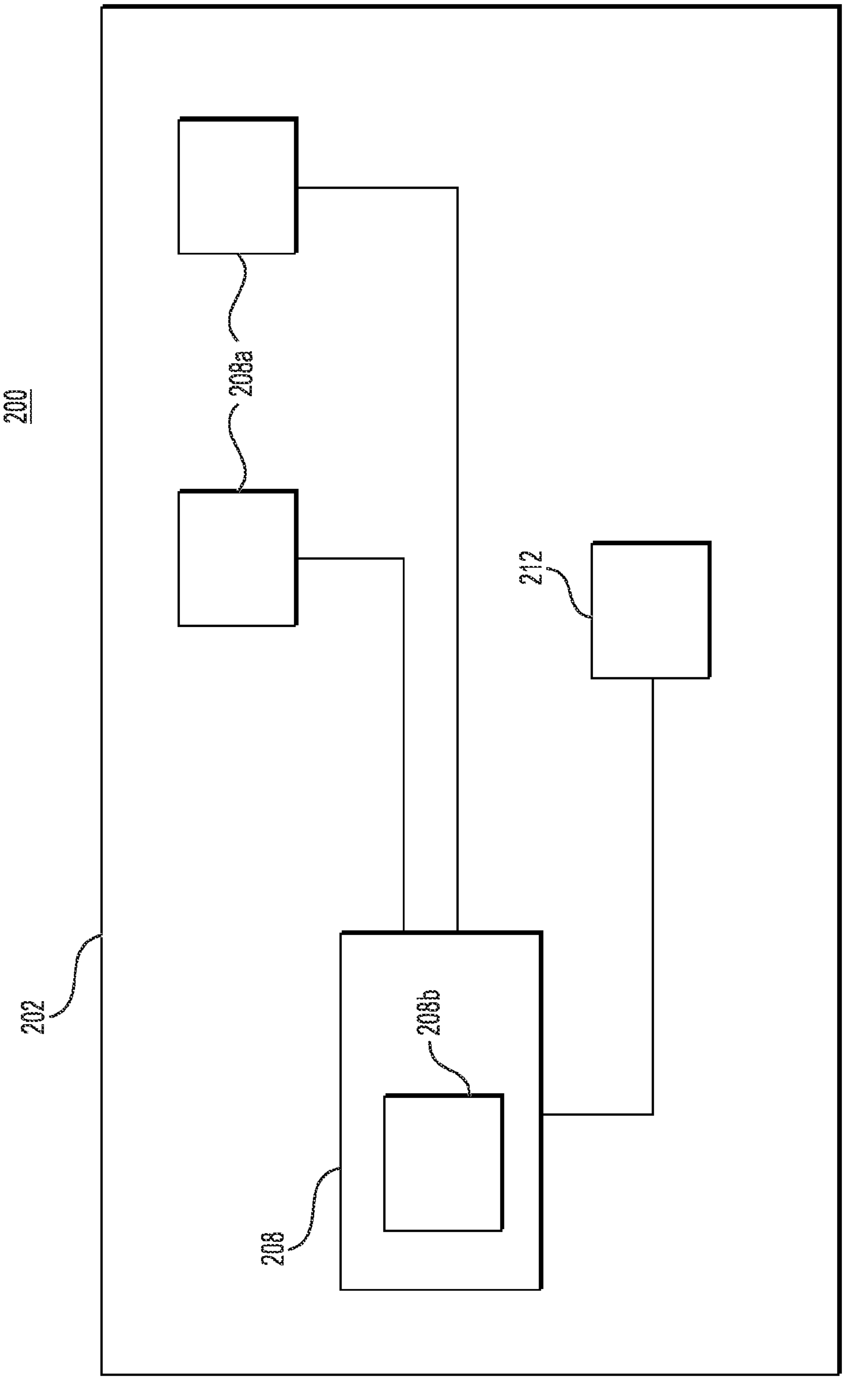

As an example of the present invention, FIG. 2A shows a post-mounted instrument 200 that is free to rotate on a mounting post 206 which can be anchored to the ground or a building for example. During active winds the tail vane 204 exerts a torque on the instrument body 202 which rotates the body into the prevailing wind direction. Simultaneously, sonic or electromagnetic one-dimension wind speed, and sonic or electromagnetic temperature measurements are being made via a processing circuit 208 (see FIG. 2B) via acoustic or electromagnetic sensor pairs 208*a*, all of which are connected to the instrument body 202. The one-dimensional wind speed measured with the sonic or electromagnetic measurement is assumed to be a measurement of the total wind speed since the acoustic or electromagnetic wave path is held in a colinear orientation with the prevailing with by the tail vane 204. The wind direction can be determined for example by a rotation sensor 212, such as a rotary encoder, connected to the processing circuit 208 positioned inside the instrument body 202 that measures the relative angle of the instrument 200 to the fixed mounting post 206. The rotational angle reported by the rotation sensor 212 can then be recorded and then mapped relative to true North to allow for the reporting of prevailing wind direction with respect to true North. Signals from the rotation sensor 212 and the acoustic or electromagnetic sensors 208*a* are sampled and recorded by a microcontroller 208*b* in the processing circuit 208, all of which are integrated with the instrument 200 for either data reduction or later analysis.

At the heart of a sonic anemometer measurement, an emitting piezo produces a spherically outgoing wave moving at the speed of sound whose center of curvature is moving at the speed of the local wind field. Sound propagation in a wind field can be modeled as an outgoing spherical wave whose center is moving at the velocity of the wind and the outgoing wavefront is propagating at the speed of sound.

In at least one embodiment, as shown in FIG. 2A, wind speed is measured using an emitter 210 mounted on a forward end of the instrument body 202 and pointing rearward along the longitudinal axis of the instrument body 202. Opposite the emitter 210 is mounted a single sensor 208*a* that detects the acoustic or electromagnetic wave signal from the emitter 210. The measurement of wind direction is accomplished with the rotation sensor 212 measuring the relative angle of the instrument body 202 with respect to the fixed mounting post 206.

Theory

Figure 3:
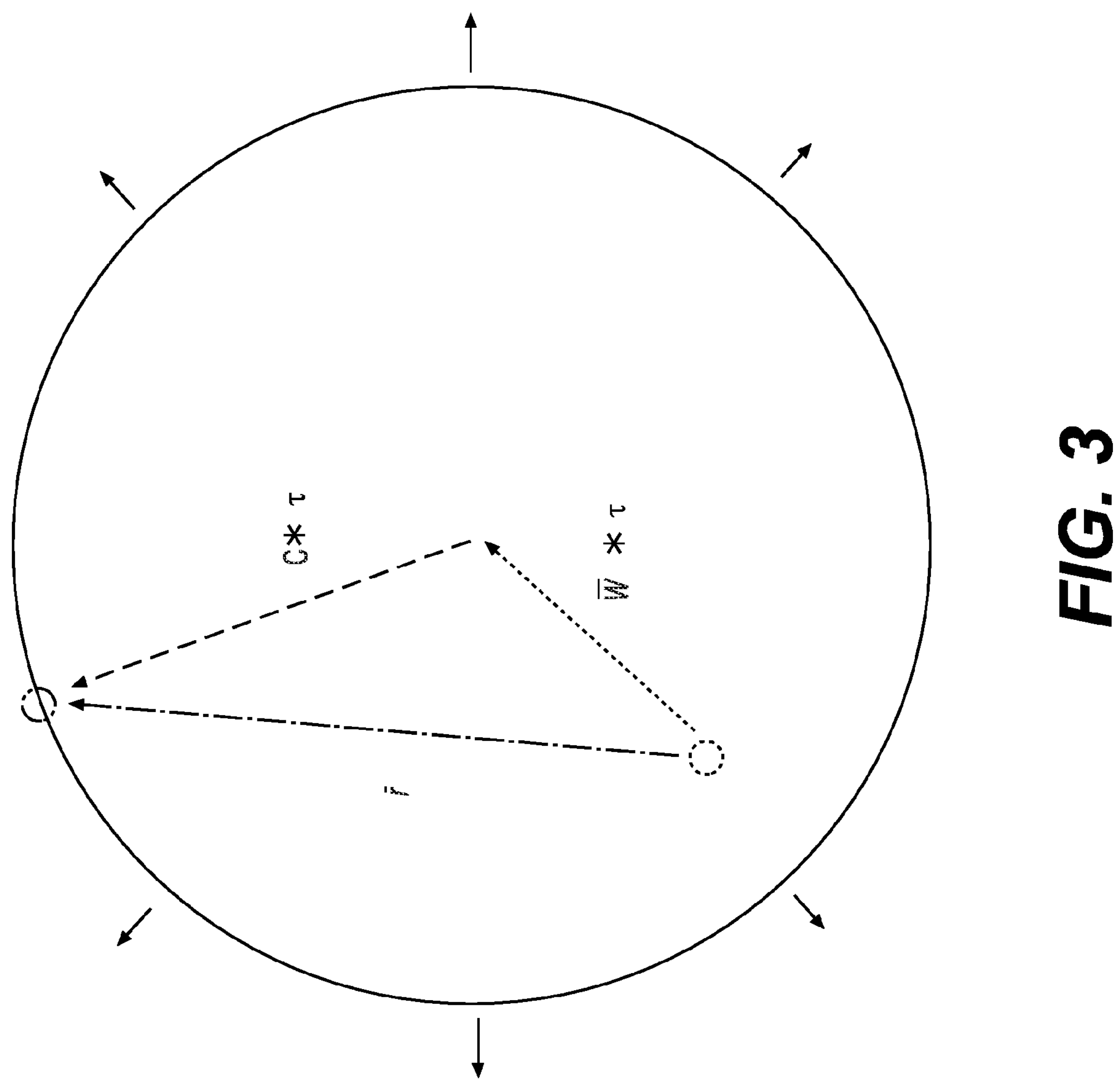
FIG. 3 shows a graphical representation of an emitting piezo produces a spherically outgoing wave moving at the speed of sound whose center of curvature is moving at the speed of the local wind field according to the present invention.

As shown in FIG. 3, $\bar{r}$ is the displacement vector from the emitter to the receiver, $\overline{w}$ is the wind velocity vector, $\tau$ is the time it takes for a wavefront to leave the emitter and be received at the receiver, and c is the speed of sound. These quantities are all geometrically related by the equation:

$$|\bar{r} - \bar{w} * \tau| = c * \tau \tag{1}$$

Squaring both sides of (1) and expanding gives.

$$\tau^2(c^2 - w^2) + 2 * \Delta x * w_x + 2 * \Delta y * w_y + 2 * \Delta z * w_z = r^2 \tag{2}$$

A single measurement of the time of flight from an emitter to a receiver is not enough information to quantify the sonic temperature since the time of flight is affected by the three components of the wind velocity as well as the speed of sound (this amounts to one equation with four unknowns). Thus, a minimum of four temperature measurements must be made to unambiguously solve for the sonic temperature. Adding three more emitters/receivers provides enough equations to solve for the unknowns, and a simultaneous solution of all four measurements of the time of flight for the wind velocity components and speed of sound can be achieved with a least squares solution to the following matrix problem:

$$\begin{bmatrix} \tau_1^2 & 2*\Delta x_1 & 2*\Delta y_1 & 2*\Delta z_1 \\ \tau_2^2 & 2*\Delta x_2 & 2*\Delta y_2 & 2*\Delta z_2 \\ \tau_3^2 & 2*\Delta x_3 & 2*\Delta y_3 & 2*\Delta z_3 \\ \tau_4^2 & 2*\Delta x_4 & 2*\Delta y_4 & 2*\Delta z_4 \end{bmatrix} \begin{bmatrix} c^2 - w^2 \\ w_x \\ w_y \\ w_z \end{bmatrix} = \begin{bmatrix} r_1^2 \\ r_2^2 \\ r_3^2 \\ r_4^2 \end{bmatrix}$$

In the above matrix, each row represents a time of flight measurement from an emitter to a receiver calculated from a window of time of interest in the raw oscilloscope time series. In this matrix problem, $r_n$ is the distance between the nth emit/receive pair, and $\Delta x_n/\Delta y_n/\Delta z_n$ are the distances in x/y/z between the nth emit/receive pair, and $\tau_n$ is the time of flight between the nth emitter and receiver. The key takeaway from a practical point of view is that the measurements do not need to be made in a conventional way where two piezos alternate acting as an emitter and a receiver which slows down the measurement update rate. Instead, four unique emitter/receivers can acquire data continuously and the wind vector components and speed of sound (and thus the sonic temperature) are solved for at any point in the data acquisition time series. This opens up the possibility for incredibly fast measurement update rates where the largest bandwidth limitation to a step response in atmospheric state is the piezo ringdown time which is typically around 2 ms.

In a CW system, the time of flight is calculated from the phase shift measured between the emitter and receiver. Practically speaking, only a single emitter is actually needed, provided there are four receivers placed in positions in space where they can detect the emitted signal (i.e., not behind the emitter) and that they have sufficient diversity in spatial position to uniquely solve for the wind velocity components and speed of sound. In practice, this simplifies construction greatly, as only a single driving tone needs to be fed to an emitting piezo and the four receivers continuously record for high speed measurements.

CW Method Advantages

Figure 4:
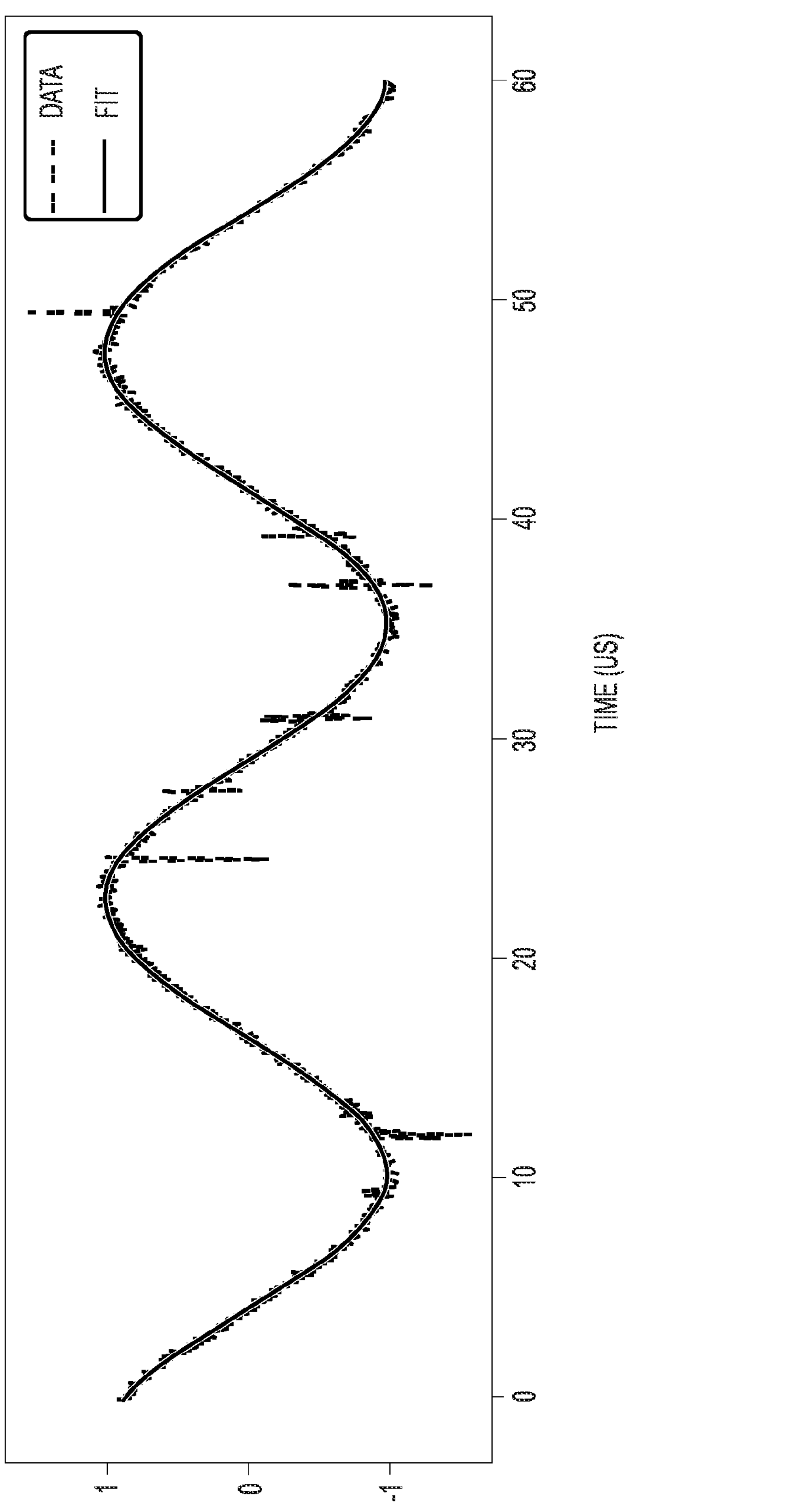
FIG. 4 shows a graph illustrating an example of raw received acoustic signal on a piezo according to the present invention.

With the CW method of the present invention, the information lives in a narrow band of frequencies (the carrier wave frequency+/−the measurement update rate) allowing most propeller and electrical motor noise to be filtered out. FIG. 4 shows an example of a raw received acoustic signal on a piezo. The dashed line is the raw signal trace, and the solid line is the sine wave fit which filters the noise spikes in the raw data.

Figures 5A, 5B:
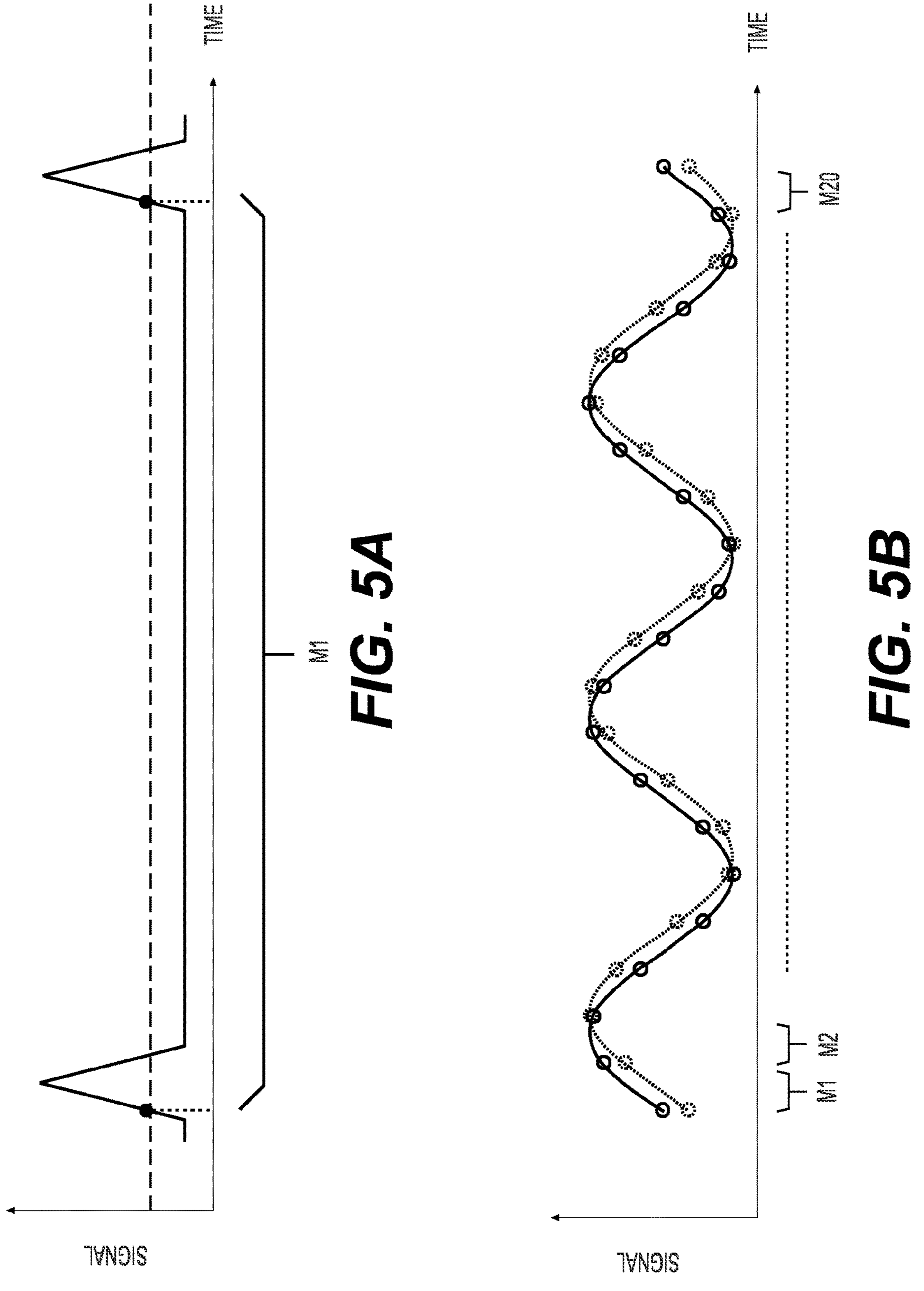
FIGS. 5A and 5B show graphs comparing time-of-flight (TOF) measurements to continuous-wave (CW) measurement according to the present invention.

Pulsed methods by contrast require high bandwidths to capture all frequency content of a narrow pulse. Measurements with pulses and CW signals are fundamentally both time of flight (TOF) measurements, but the CW method looks for a phase shift between the emitted and received sine waves for estimating the time of flight. The advantage of making phase shift measurements is that if a received piezo signal is continuously sampled either with audio recording equipment or digital oscilloscopes, the measurement update rate can be as high as the digital sampling rate and many hundreds or thousands of measurements can be made in the same window of time as a single pulsed TOF measurement, thereby improving signal to noise ratios and opening up the possibility of resolving high speed atmospheric phenomena. FIGS. 5A and 5B compare a TOF measurement to a CW measurement, wherein FIG. 5A shows in a single pulsed TOF measurement period (top) where the time between the emitted pulse crossing a threshold value and the received signal crossing a threshold value.

In contrast, FIG. 5B shows a plurality (i.e., thousands) of CW samples being taken by high speed sampling equipment in the same time period as the single pulsed TOF measurement period. Each sample of two or more sinusoids captures a measurement of the phase shift between them, allowing many hundreds or thousands of phase measurements to be averaged together for high SNR in the same time a single pulsed measurement can be made.

For high speed measurements, characterizing the instrument uncertainty is a major part of the measurement, in particular for cn squared applications data that use temperature variance spectra as an input. In this regard, direct recording of the CW signals has an advantage over pulsed time of flight units in that often the time of flight is determined with an amplitude threshold circuit. Since all acoustic pulses are not perfect square waves, the slope on the leading edge of the acoustic pulse introduces an uncertainty in the time of flight as a function of acoustic pulse amplitude commonly known as 'walk error'. If unaccounted for, the walk error represents an unquantified uncertainty in a time series of anemometer data. With direct recording of CW signals, the uncertainties associated with acoustic amplitude fluctuations can be more directly quantified since the signal amplitude information is captured in the raw data.

In the context of the described invention only a single acoustic path is needed to measure the time of flight. The time of flight from the emitter to the receiver is dependent on the speed of sound and the wind speed. If the ambient temperature is measured separately with a thermometer the sound speed can be estimated and then the wind speed calculated. If the speed of sound is not being estimated by a thermometer the acoustic path can either be measured with the two piezos acting as an emitter and receiver in an alternating sequence to solve for the sonic temperature and wind speed. Alternatively a single emitter can be measured by two receivers that are coplanar with the prevailing wind speed but are are different distances from the emitter to allow for unique solution of sonic temperature and wind speed at rates not limited by the time required for a piezo pair to alternate acting as an emitter and then a receiver.

Measurement System

Figure 6:
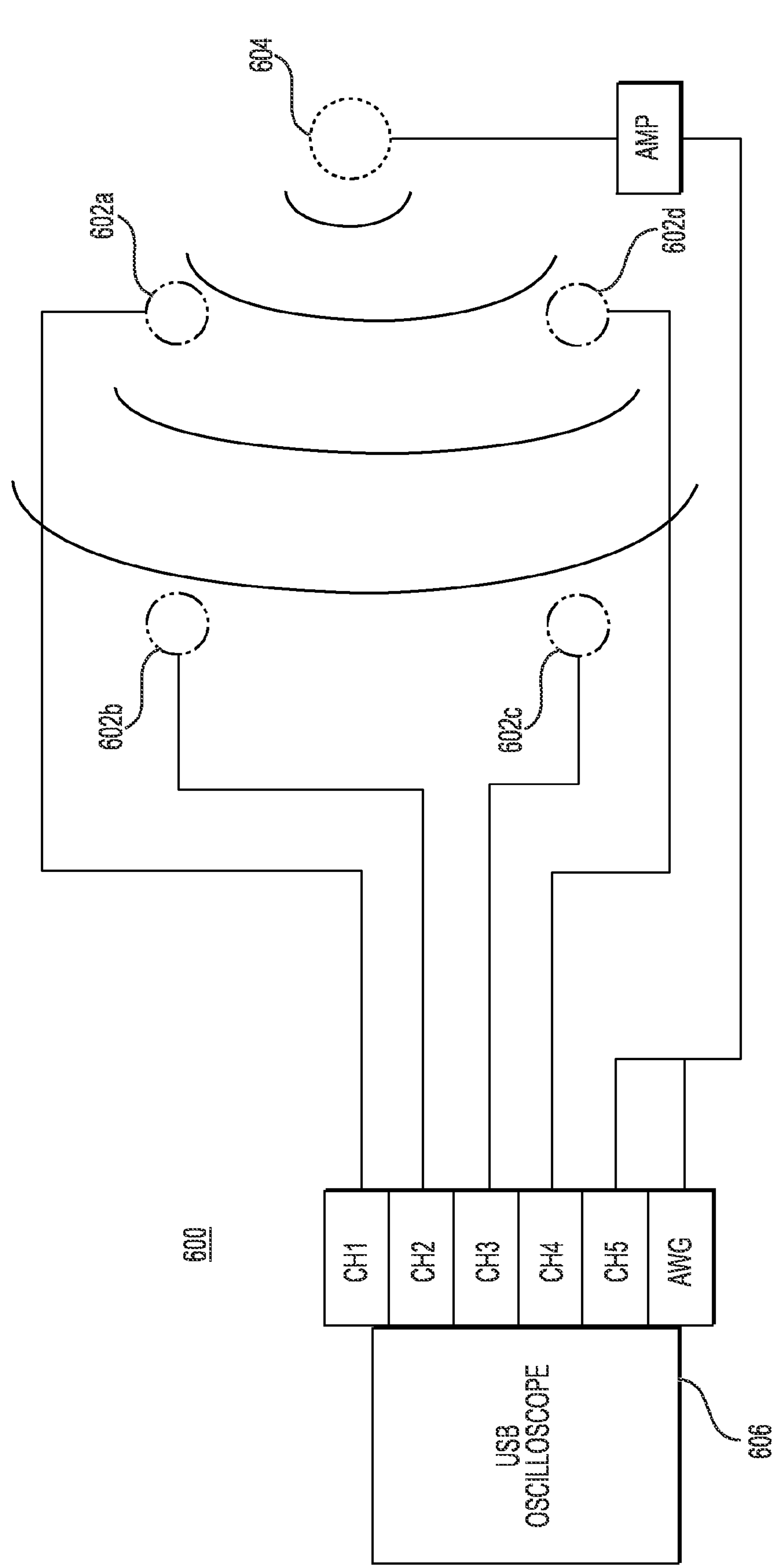
FIG. 6 illustrates a proposed measurement block diagram for an all acoustic measurement of all three wind vector components and the speed of sound according to the present invention.

In at least one embodiment of the present invention, for a sonic anemometer system 600 to measure all three components of a wind vector and the sonic temperature, four (4) receiver transducers 602*a*-602*d* are set up as shown in FIG. 6, wherein a tone is generated, amplified, and then emitted by an acoustic transducer 604 and the acoustic tone is detected by the multiple receiver transducers 602*a*-602*d*. The electrical signals from the receiving transducers are sampled by an analog to digital (A/D) converter 606 such as an oscilloscope in combination with the waveform originally generated for amplification and emission.

Figure 7:
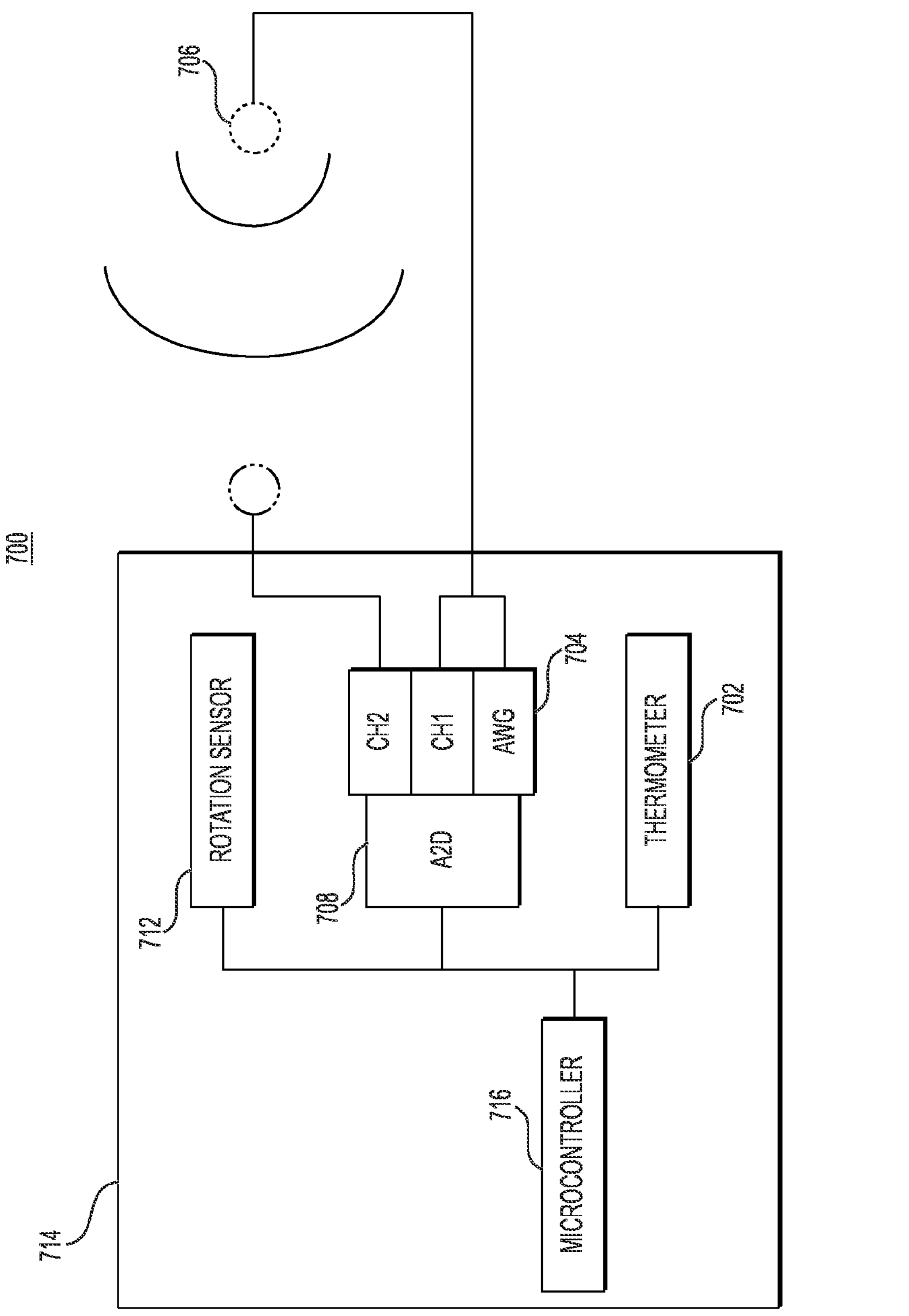
FIG. 7 shows a block diagram of the system components for measurement of the speed of sound with a thermometer, an acoustic transducer pair for wind speed determination, and a rotation sensor for measurement of the wind direction.

FIG. 7 illustrates an embodiment of a measurement block system 700 wherein wind speed is measured with a single acoustic measuring system, while the speed of sound is measured separately with a thermometer 702. A waveform such as a sine wave from an waveform generator oscilloscope 704 is amplified to drive a piezo emitter 706. The emitted sinusoid is also sampled by an analog to digital (A/D) converter 708. A single transducer 710 that detects the emitted acoustic wave is driven by the acoustic wave of the emitter 706 and the sinusoidal response is captured at high speeds by the A/D converter 708. No multiplexing or alternating of emitter/receiver roles makes long term high speed measurements possible, since the measurement update rate can be as fast as the sampling rate of the A/D converter 708. Measurement of wind direction is accomplished with a rotation sensor 712 measuring the relative angle of the instrument housing 714 with respect to the structure onto which it is mounted. The rotation angle is recorded by a microcontroller 716.

Figure 8:
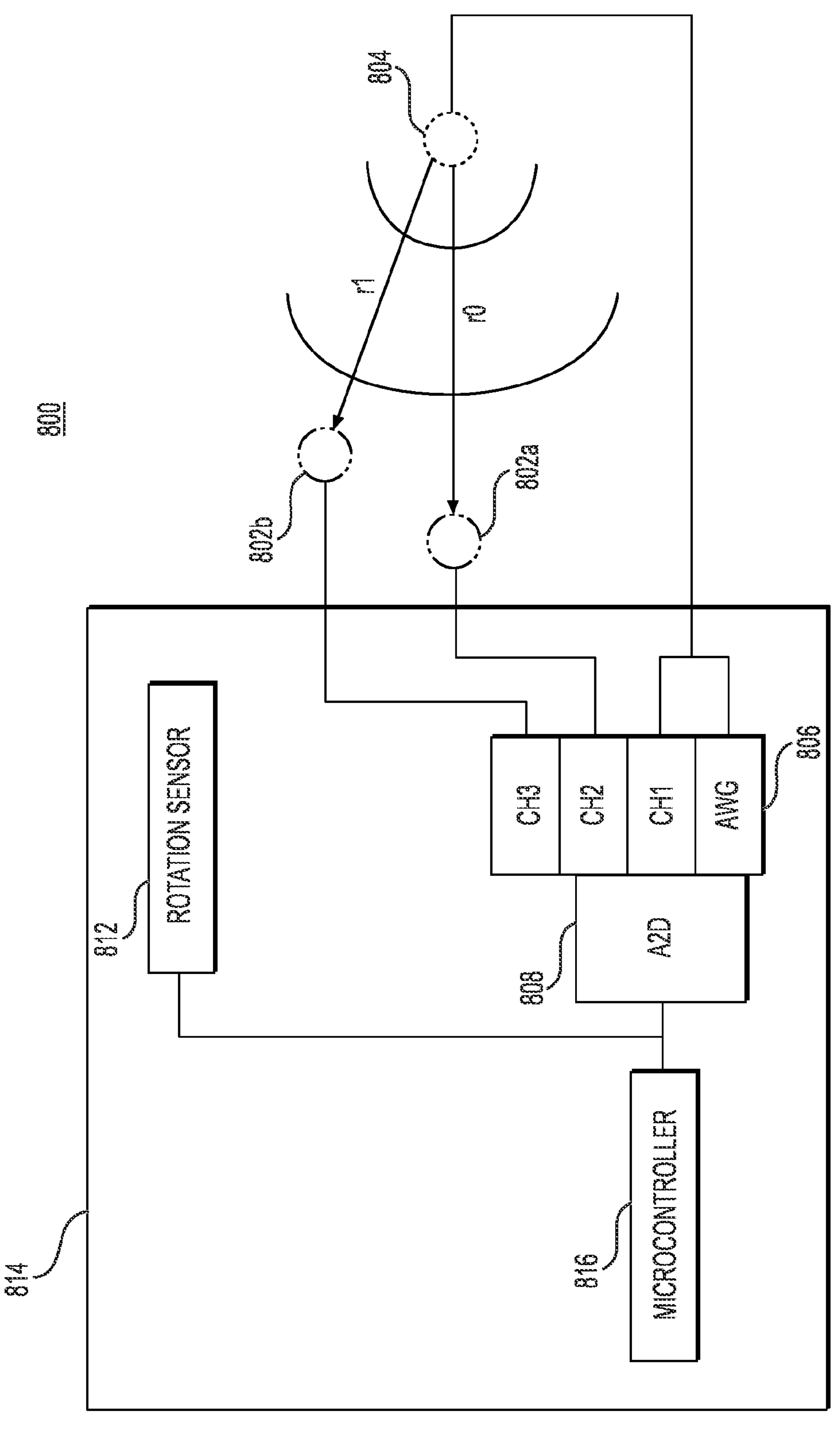
FIG. 8 shows a block diagram of a system where the speed of sound and wind speed are recorded acoustically and the wind speed is recorded with a rotation sensor.

Another embodiment for a sensing system 800 is shown in FIG. 8 wherein the speed of sound can be measured directly instead of estimated from temperature measurements made with a thermometer. To measure the sonic temperature and wind speed, two sensor receivers 802*a*-802*b* at different distances r0 and r1 from the emitter 804 sample the acoustic tone generated by the emitter 804. The time of flight information contained in the two sensor receivers 802*a*-802*b* allows for the calculation of the speed of sound and the wind speed. A waveform such as a sine wave from an waveform generator oscilloscope 806 is amplified to drive the emitter 804. The emitted sinusoid is also sampled by an analog to digital (A/D) converter 808. The transducers 802*a*-802*b* that detect the emitted acoustic wave are driven by the acoustic wave of the emitter 804 and the sinusoidal response is captured at high speeds by the A/D converter 808. Again no multiplexing or alternating of emitter/receiver roles makes long term high speed measurements possible, since the measurement update rate can be as fast as the sampling rate of the A/D converter 808. Measurement of wind direction is accomplished with a rotation sensor 812 measuring the relative angle of the instrument housing 814 with respect to the structure onto which it is mounted. The rotation angle is recorded by a microcontroller 816.

Data reduction would start with deciding a measurement duration window period (e.g. 5 ms) where the phase shifts between the emitter and the receivers in the 5 ms window are calculated and used to solve for the wind vector and sonic temperature. The 5 ms wind can be slid over one measurement sample and the calculations are repeated. In this way, the data analyst has the freedom to choose a measurement window period for interrogating high or low speed dynamics and can look at these dynamics on a sub microsecond update rate if desired.

The principle of using sonic measurement, the emission of sound waves, can be extended to other forms of active measurements using alternative waveforms. Electromagnetic waveforms, such as but not limited to optical and radio wavelengths, can also be used in analogous manners to measure wind speed.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

I claim:

1. A hybrid stationary anemometer system for measuring a volume space of interest in an atmosphere, comprising:

a mechanical wind vane to align at least one 1-dimensional anemometer in the wind direction and measure the wind direction; and an electronic processing circuit that processes data from the mechanical wind vane and the at least one 1-dimensional anemometer, wherein the at least one 1-dimensional anemometer includes a single output signal generator and a received signal detector, the single output signal generator including a single piezo and/or electromagnetic emitter configured to emit an output signal through the volume space, the received signal detector includes at least four piezo and/or electromagnetic receivers operatively connected to receive an output signal from the single piezo and/or electromagnetic emitter, each of the at least four piezo and/or electromagnetic receivers being operatively mounted to be spatially separated from the single piezo and/or electromagnetic emitter, and the wind vane is operatively connected to movably align with a direction of movement of wind in the volume space, the single piezo and/or electromagnetic emitter and the at least four piezo and/or electromagnetic receivers being fixedly and spatially mounted to the wind vane along a single plane such that the at least four piezo and/or electromagnetic receivers are operatively aligned to receive the output signal emitted through the volume space from the single piezo and/or electromagnetic emitter while the wind vane aligns with the direction of the wind movement.

2. A hybrid anemometer system according to claim 1, wherein the output signal is produced by an electronic signal generator.

3. A hybrid anemometer system according to claim 1, wherein the single piezo and/or electromagnetic emitter and the at least four piezo and/or electromagnetic receivers are mounted on extension arms spatially separated from each other such that portions of the volume space pass through between the single piezo and/or electromagnetic emitter and the at least four piezo or electromagnetic receivers.

4. A hybrid anemometer system according to claim 1, wherein the at least one 1-dimensional anemometer further includes a thermometer configured to measure a local atmospheric temperature of the volume space.

5. A hybrid anemometer system according to claim 1, wherein electronic processing circuit is configured to process the data from the mechanical wind vane and the at least one 1-dimensional anemometer based on formulas (1) and (2):

$$|\bar{r} - \bar{w} * \tau| = c * \tau \quad (1)$$

$$\tau^2(c^2 - w^2) + 2 * \Delta x * w_x + 2 * \Delta y * w_y + 2 * \Delta z * w_z = r^2 \quad (2)$$

wherein $\bar{r}$ is the displacement vector from the emitter to one of the at least four receivers, $\overline{w}$ is the wind velocity vector, $\tau$ is the time for a wavefront to leave the emitter and be received at the one of the at least four receivers, and c is the speed of sound, and further based on the matrix equation:

$$\begin{bmatrix} \tau_1^2 & 2*\Delta x_1 & 2*\Delta y_1 & 2*\Delta z_1 \\ \tau_2^2 & 2*\Delta x_2 & 2*\Delta y_2 & 2*\Delta z_2 \\ \tau_3^2 & 2*\Delta x_3 & 2*\Delta y_3 & 2*\Delta z_3 \\ \tau_4^2 & 2*\Delta x_4 & 2*\Delta y_4 & 2*\Delta z_4 \end{bmatrix} \begin{bmatrix} c^2 - w^2 \\ w_x \\ w_y \\ w_z \end{bmatrix} = \begin{bmatrix} r_1^2 \\ r_2^2 \\ r_3^2 \\ r_4^2 \end{bmatrix}$$

wherein each row represents a time of flight measurement from the emitter to each one of the at least four receivers calculated from a window of time of interest in a raw signal time series, $r_n$ is the distance between the nth emit/receive pair, and $\Delta x_n/\Delta y_n/\Delta z_n$ are the distances in x/y/z between the nth emit/receive pair, and $\tau_n$ is the time of flight between the nth emitter and receiver.

6. A method of enhancing an anemometer system, comprising the steps of:

providing a mechanical wind vane to align at least one 1-dimensional anemometer in the wind direction and measure the wind direction; and processing via an electronic processing circuit data from the mechanical wind vane and the at least one 1-dimensional anemometer, wherein the at least one 1-dimensional anemometer includes a single output signal generator and a received signal detector, the single output signal generator including a single piezo and/or electromagnetic emitter configured to emit an output signal through the volume space, the received signal detector includes at least four piezo and/or electromagnetic receivers operatively connected to receive an output signal from the single piezo and/or electromagnetic emitter, each of the at least four piezo and/or electromagnetic receivers mounted spatially separated from the single piezo and/or electromagnetic emitter, and the wind vane movably aligning with the direction of movement of wind in the volume space, the single piezo and/or electromagnetic emitter and the at least four piezo and/or electromagnetic receivers being fixedly and spatially mounted to the wind vane along a single plane such that the at least four piezo and/or electromagnetic receivers are operatively aligned to receive the output signal emitted through the volume space from the single piezo and/or electromagnetic emitter while the wind vane aligns with the direction of the wind movement.

7. A method according to claim 6, where the at least one anemometer includes at least one thermometer for reading a local atmospheric temperature so as to calculate a measured wind speed from time-of-flight observed by the acoustic and/or electromagnetic wave emitter and receiver.

8. A method according to claim 6, where the at least one 1-dimensional anemometer is a sonic anemometer that uses the time-of-flight between the emitter and the receiver to calculate the wind speed.

9. A method according to claim 6, where the 1-dimensional anemometer is provided with:

a waveform generator emits a continuous wave signal across the volume of space to be measured.

10. A method according to claim 9, where the time-of-flight measurement is calculated by a phase delay between the emitted and received signal.

11. A method according to claim 6, the step of processing via the electronic processing circuit includes processing the data from the mechanical wind vane and the at least one 1-dimensional anemometer based on formulas (1) and (2):

$$|\bar{r} - \bar{w} * \tau| = c * \tau \quad (3)$$

$$\tau^2(c^2 - w^2) + 2 * \Delta x * w_x + 2 * \Delta y * w_y + 2 * \Delta z * w_z = r^2 \quad (4)$$

wherein $\bar{r}$ is the displacement vector from the emitter to one of the at least four receivers, $\overline{w}$ is the wind velocity vector, $\tau$ is the time for a wavefront to leave the emitter and be received at the one of the at least four receivers, and c is the speed of sound, and further based on the matrix equation:

$$\begin{bmatrix} \tau_1^2 & 2*\Delta x_1 & 2*\Delta y_1 & 2*\Delta z_1 \\ \tau_2^2 & 2*\Delta x_2 & 2*\Delta y_2 & 2*\Delta z_2 \\ \tau_3^2 & 2*\Delta x_3 & 2*\Delta y_3 & 2*\Delta z_3 \\ \tau_4^2 & 2*\Delta x_4 & 2*\Delta y_4 & 2*\Delta z_4 \end{bmatrix} \begin{bmatrix} c^2 - w^2 \\ w_x \\ w_y \\ w_z \end{bmatrix} = \begin{bmatrix} r_1^2 \\ r_2^2 \\ r_3^2 \\ r_4^2 \end{bmatrix}$$

wherein each row represents a time of flight measurement from the emitter to each one of the at least four receivers calculated from a window of time of interest in a raw signal time series, $r_n$ is the distance between the nth emit/receive pair, and $\Delta x_n/\Delta y_n/\Delta z_n$ are the distances in x/y/z between the nth emit/receive pair, and $\tau_n$ is the time of flight between the nth emitter and receiver.

* * * * *